(12) United States Patent
Leonard (10) Patent No.: US 9,038,093 B1
(45) Date of Patent: May 19, 2015

(54) RETRIEVING SERVICE REQUEST MESSAGES FROM A MESSAGE QUEUE MAINTAINED BY A MESSAGING MIDDLEWARE TOOL BASED ON THE ORIGINATION TIME OF THE SERVICE REQUEST MESSAGE

(71) Applicant: Sprint Communications Company L.P., Overland Park, KS (US)

(72) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 182 days.

(21) Appl. No.: 13/794,730

(22) Filed: Mar. 11, 2013

(51) Int. Cl.
*G06F 9/54* (2006.01)

(52) U.S. Cl.
CPC .................................... *G06F 9/546* (2013.01)

(58) Field of Classification Search
CPC ........................ G06F 2209/547; G06F 9/546
USPC .......................................................... 719/314
See application file for complete search history.

(56) References Cited

U.S. PATENT DOCUMENTS

| 6,862,595 | B1* | 3/2005 | Elko et al. ............................. 1/1 |
| 2008/0201712 | A1* | 8/2008 | Nottingham et al. ......... 718/101 |
| 2012/0059882 | A1* | 3/2012 | Stark et al. .................... 709/205 |
| 2013/0254376 | A1* | 9/2013 | Kudikala et al. .............. 709/224 |

OTHER PUBLICATIONS

IBM, "IBM WebSphere MQ V7.1 and V7.5 Features and Enhancements" (Feb. 28, 2013), IBM Redbooks, pp. 1-492 [retrieved from http://www.redbooks.ibm.com/abstracts/sg248087.html].*
Wyatt, T.R.; Baddeley, G.; Casey, N.; Nguyen, L.; Pedersen, J.H.; Saetra, M., "Secure Messaging Scenarios with WebSphere MQ" (Nov. 2012), IBM Redbooks, pp. 1-366 [retrieved from http://www.redbooks.ibm.com/redpieces/abstracts/sg248069.html].*
Davies, S.; Broadhurst, P., "WebSphere MQ V6 Fundamentals" (Nov. 2005), IBM Redbooks, pp. 1-448 [retrieved from www.redbooks.ibm.com/redbooks/pdfs/sg247128.pdf].*
Taylor, M., "WebSphere MQ Primer: An Introduction to Messaging and WebSphere MQ" (Dec. 2012), IBM Redbooks, pp. 1-64 [retrieved from www.redbooks.ibm.com/redpapers/pdfs/redp0021.pdf].*
IBM, "WebSphere MQ Application Programming Guide" (Mar. 2006), pp. 1-601 [retrieved from https://mainframeqns.files.wordpress.com/2012/02/mq-application-programming-guide.pdf].*

(Continued)

*Primary Examiner* — Brian W Wathen (57) ABSTRACT

Systems and methods for retrieving service request messages stored in a messaging queue and received by a queue in real-time. The service request messages are retrieved using a plurality of threads that comprise at least one retrieval criteria. Service request messages may be retrieved from the message queue or retrieved as they are received by the message queue in real-time using criteria in addition to or instead of the arrival time of the service request message which may also be referred to as the put-time. Service request messages may be requested and retrieved in an iterative process wherein multiple threads execute consecutively, concurrently, or a combination of both, in order to retrieve service request messages requested by an application.

18 Claims, 6 Drawing Sheets

(56) References Cited

OTHER PUBLICATIONS

Rendkar, A.; Walzer, C.; Boyd, S.; Costall, R.; Rabold, K.; Redkar, T., "Pro MSMQ: Microsoft Message Queue Programming" (2004), Apress, pp. 235-268.*

Davies, S.; Baddeley, G.; Cernicky, M.; Cuttell, B.; Jha, R.P.; Sapolyo, B.; Shivaprasad, A.; Suarez, V.; Thyagaraj, L., "WebSphere MQ V7.0 Features and Enhancements" (Jan. 2009), IBM Redbooks, pp. 1-434 [retrieved from www.redbooks.ibm.com/redbooks/pdfs/sg247583.pdf].*

* cited by examiner

```
                    ┌─────────────────────┐
                    │ Receive request from│
                    │ application to       │─── 302
                    │ retrieve msg(s)      │
                    │ from the msg queue.  │
                    └──────────┬──────────┘
                   ┌───────────┴───────────┐
                   ▼                       ▼
         ┌──────────────────┐    ┌──────────────────┐
    402 ─│ Execute a first  │    │ Execute a second │─ 404
         │ thread on the    │    │ thread on the    │
         │ msg queue.       │    │ msg queue.       │
         └────────┬─────────┘    └────────┬─────────┘
                  └───────────┬───────────┘
                              ▼
                    ┌──────────────────┐
                306─│  Message(s)       │
                    │    found?         │
                    └──┬────────────┬───┘
                  YES  │            │  NO
         ┌─────────────┤            ├──────────────┐
         ▼             ▼            ▼              ▼
   ┌──────────┐  ┌──────────┐ ┌──────────┐  ┌──────────┐
   │  Return  │  │ Execute  │ │ Execute  │  │ Return   │
   │ messages.│  │ another  │ │ another  │  │ "no msg" │
   │          │  │ thread.  │ │ thread.  │  │notific.  │
   └──────────┘  └──────────┘ └──────────┘  └──────────┘
       308           310          312            314
```

FIG. 6

RETRIEVING SERVICE REQUEST MESSAGES FROM A MESSAGE QUEUE MAINTAINED BY A MESSAGING MIDDLEWARE TOOL BASED ON THE ORIGINATION TIME OF THE SERVICE REQUEST MESSAGE

CROSS-REFERENCE TO RELATED APPLICATIONS

None.

STATEMENT REGARDING FEDERALLY SPONSORED RESEARCH OR DEVELOPMENT

Not applicable.

BACKGROUND

Telecommunications service providers may use a messaging handler, or backbone, that enables secure, reliable, and rapid transport of data and messages across applications, systems, and services of the telecommunications service provider. Conventionally, a messaging product may allow for applications to retrieve messages that are in queue by methods such as first-in-first-out, priority sorted order, or by the specific message or message correlation identifier but do not provide a way to retrieve messages that fit a specific priority, message creation time, or concurrent delivery of messages.

SUMMARY

In an embodiment, a system for reviewing messages from a queue using a message middleware tool, comprising: a message middleware tool comprising a plurality of threads that communicate a request for messages from each of a plurality of applications to a message queue on a server, wherein the request for messages is received from an application of a plurality of applications, and a first plurality of messages and a second plurality of messages. The embodiment further comprising: wherein each message of the first plurality of messages and the second plurality of messages comprises at least one field of a plurality of fields; wherein each thread has at least one criteria; and wherein the message middleware tool executes at least one thread of the plurality of threads based upon an at least one criteria and returns at least one message from at least one of the first plurality of messages and the second plurality of messages based on a determination that the at least one message meets the at least one criteria of the at least one thread.

In an embodiment, method for retrieving messages from a queue using a message middleware tool, comprising: executing, by a message middleware tool, at least one thread of a plurality of threads on a message queue wherein the message queue comprises a plurality of messages comprising a plurality of fields, wherein the plurality of fields comprises a time the message was put into the queue, a priority, an originator, a content, and a message identifier, and wherein each thread of the plurality of threads comprises at least one criteria. The embodiment further comprising: wherein the at least one thread is executed in response to receiving, from an application, a request for at least one message from the message queue; returning, by the message middleware tool to the application, at least one message based on the at least one thread in response to a determination that at least one message meets the criteria of the thread is in the message queue; and returning, in response to a determination that no messages in the message queue meet the criteria of the thread, a notification to the application.

In an alternate embodiment, a method for retrieving messages from a queue using a message middleware tool, comprising: receiving, by a message middleware tool from an application, a first request to retrieve at least one message from a plurality of messages stored in a message queue and executing, by the message middleware tool, in response to receiving the first request, a first thread of a plurality of threads on the plurality of messages stored in the message queue. The embodiment further comprising wherein each message of the plurality of messages comprises a plurality of fields, and wherein each thread of the plurality of threads comprises at least one criteria, and executing, by the message middleware tool, a second thread of the plurality of threads on the message queue, wherein the second thread executes on messages received in the queue in real-time and applies the at least one criteria, and returning, by the message middleware tool to the application, an at least one message based on the first thread in response to a determination that the at least one message in the message queue meets the criteria of the first thread. The embodiment also comprising: returning, by the message middleware tool to the application, concurrent with the message returned in response to the first thread, at least one message based on the second thread in response to a determination that at least one message meeting the criteria of the second thread is in the message queue, wherein the message returned based on the first thread is different than the message returned based on the second thread, and returning, in response to a determination that at least one of the first thread or the second thread did not retrieve messages, a notification to the application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Disclosed herein are systems and methods for concurrent delivery of real-time service request messages and delayed messages as well as priority-based and time-based delivery of messages in a messaging middleware environment. A system and method for retrieving service request messages from a message queue maintained by a messaging middleware tool based on the origination time of the service request message is taught. In an embodiment, the messaging middleware tool executes on a server computer and the message queue may be maintained on the server by the messaging middleware tool. In an embodiment, a service request message is a message requesting a type of service from the entity, such as a telecommunications service provider, that maintains or reviews the queue. As used herein, a service request message may also be referred to as a message, or a message from a message queue. Telecommunications service providers may use messaging handlers to queue and push messages to various applications, systems, and services. The providers may use a system such as the IBM Websphere MQ messaging product which allows the telecommunications service provider's applications to retrieve messages that are in a message queue. Conventionally, these messages may be retrieved in a first-in-first-out (FIFO) system, where each message is retrieved in the order it was received, or by priority sorted order (i.e. where a message with a priority 9 is retrieved before a message with a priority of 1), or by a specific message or message correlation identifier. However, these systems may not provide a mechanism for retrieving messages with a specific priority, a priority range, or a time of message creation. In some embodiments, there may be a mechanism to have concurrent delivery of both delayed and real-time transactions. Messages received by a system or systems are queued by the messaging middleware environment. These messages are retrieved as applications, servers, or other systems have the capacity, authorization, or instruction, to address the messages.

In an embodiment, a mechanism retrieves messages from a message queue based upon the specific priority of messages in the message queue. For example, on a messaging priority scale from 1-10 where 10 is the highest priority, if the application program only wants to retrieve message with a priority of 3, only those messages with a priority 3 will be retrieved. In a related example, if the application programming only wants to retrieve messages with a priority of 8-10 only those messages with a priority of 8-10 will be retrieved, regardless of when the messages were received. The messages with the requested priority or range of priority may be further ordered by other fields including time received, time in queue, topic, or other fields. This method allows for a more flexible way to implement priority-based processing of messages and supports the notion of having different numbers of remote connections, which may also be referred to as threads, to the message queue with each thread handling a different priority level or range of priority levels. This retrieval method may be employed, for example, if a sale or other special promotion is starting at a specific time in the future. The messages that accumulate prior to the start of the special promotion would either be purged or saved for later processing wherein another method for selecting those messages would be employed.

In an alternate embodiment, a message or plurality of service request messages are retrieved from the message queue based upon the time the message was written to the message queue regardless of other messages that are in that message queue, which may also simply be referred to as a queue for purposes herein. For example, a message or messages may be retrieved that were received after 2:00 AM on a particular day, even if messages that were received prior to that time are not retrieved. The remaining messages may be retrieved by FIFO, allowed to expire, or retrieved by a method disclosed herein. This method may allow for a more straightforward way to implement time-based processing of messages and reduce the need for a higher-level application program to implement processing to either calculate the current time or implement loop processing to determine which messages can be processed. In addition, the method may allow messages that do not fit into the selected timespan or trigger date to queue up and wait for processing after the selected timespan or trigger date has been reached.

In an embodiment, if no messages are found in the queue or from messages received in real-time during the time period during which the thread was run, that meet the one or more criteria of a first thread, a notification may be returned to the application that there were no messages available. In the alternative or in addition to this notification, a second thread comprising different criteria may be executed. This thread may be executed automatically or in response to an indication from the application that the second thread should execute. This process may continue in a looping or iterative manner until all the appropriate threads have been exhausted, until the application retrieves a minimum or maximum number of messages, or until the process is stopped by the application, the messaging middleware tool, an administrator or user, or the queue.

In another embodiment, the concurrent delivery of both delayed and real-time transactions allows real-time transactions to be completed without, for example, delaying retail sales and also allows for delayed transactions to be processed in a timelier manner once the trigger time has passed. This mechanism may allow messages to queue until a pre-determined point in time and then allow for the real-time delivery of new messages concurrently with the delivery of delayed message in the order that separate applications threads can process the messages at the same time, that is, a plurality of threads processes messages concurrently based upon various criteria of the messages. Using this method, an application can process messages that have been stored in the queue that meet a certain criteria or plurality of criteria while also receiving and processing messages that are just arriving in the queue that meet the same or a different set of criteria. In some embodiments, the thread may retrieve using FIFO and then execute another criteria, set of criteria, or thread, to either order the retrieved messages or further filter the retrieved messages, or a combination of both. By concurrent retrieval, an application can clear out a queue using selected criteria while pulling from messages as they are received in order to prevent or reduce the backlog of messages in the queue. For example, an activation protocol or process for a newly launched mobile device may not be available until midnight on Saturday. However, pre-sale of the mobile devices may commence prior to that time. The sale component of the activation process may complete prior to midnight on Saturday but the remainder of the activation would remain incomplete. At a point after midnight on Saturday, messages queued before midnight on Saturday may be processed in the order they were received or in another sorting order. In addition to retrieval of messages stored in the queue, messages received in real-time that meet the criteria to be processed may also be pulled concurrently with messages from the queue.

In these embodiments, at least one application of a plurality of applications request messages from a messaging middleware tool from the message queue based upon a put-time, that is, the time the message was put into the queue, or based upon a priority, or a combination of put-time, priority, and other fields. The priority discussed herein may be a numerical priority assigned by issue, or may be a numerical, color, pattern, or other coded priority depending upon whether the message originated from the telecommunications service provider, from a partner or customer of the telecommunications service provider, or from an entity not associated with the telecommunications service provider. The methods disclosed herein may be used during, for example, a pre-sale event wherein new devices are offered for sale days, weeks, or hours before the telecommunications service provider intends upon or is capable of supporting those devices. In such a case, the normal activation process may be used to process the advanced sale of the device, but the actual activation of the device may be halted or paused when the process encounters a processing node that queues the message until a specific time when the message may be processed and the device activation completed. In one example, the middleware may look at the message put-time to determine whether an action can be processed. This allows messages to pile up in the queue in either a priority or FIFO delivery queue but a read operation is posted to look for a specific time period such as a range or a "delivered after" or "delivered before" date. The operation, such as the activation operation, will complete once a message is written to the queue that has a put time equal to or greater than the trigger time, or within a specified range of trigger times. One benefit of this disclosure is a simplified code wherein the programmer may not use a significant portion of external code to cause a thread to "sleep" or go dormant until a certain time period or other triggering event, and the thread may not have to "wake up" or become active periodically to determine if the thread should execute, terminate, etc. In one example, once a call or request for action in the queue returns with an indication that the requested action is valid, the application program may spawn a different thread or plurality of threads with restrictive priority-based operations.

In an embodiment, a queue index may be created if, for example, a time-based put-time option is created. This option may index the queue based upon put-time and when new messages are written to the queue and read from the queue to determine the put-time, the index will be updated. In another embodiment, a plurality of threads are generated wherein each thread processes incoming messages or messages from the queue based on at least one of a number of fields including priority. When an application requests a message via a request to get a message, or a "GET call," by specifying a message priority or range of priority, the first message in the index with the specified priority or within the specified range of priority is looked up and returned through the communications layer to the requesting application.

In another embodiment, there may be a single path through the messages in the queue, which is either directed straight through the sequence of arrival and/or priority, or which uses a dual-sort priority wherein first the priority is evaluated and then, if two messages that meet the priority criteria were sent at different times, the sequence of arrival or the sequence of arrival before or after a pre-determined time is used to pull the messages from the queue. This may be referred to as a sequence or series of restrictive filters. In a restrictive filter, messages stored in the queue may first be retrieved by a first thread based upon a put-time or a range of put-times. If the first thread returns no results or a message indicating there are no results, messages that qualify by other fields or criteria are pulled in a specified order based upon criteria in the first thread or based on criteria in a second thread. In one example, these other fields or criteria would be priority based on a numeric system due to issue, based on a coded or numeric system that may indicate the originator of the message, and then may be retrieved based upon what may be referred to as a primary thread criteria and then sorted by a second thread criteria. In an alternate embodiment, messages may be retrieved in real-time or from what was previously stored in the message queue based upon multiple criteria in a thread or based on multiple threads, which may be done in an iterative process as disclosed below.

It is appreciated that if a thread is executing on messages as they are received into the queue (real-time) the thread may have a predetermined attribute that determines how long the thread executes before returning messages, a notification that there are no messages, executing another thread, or giving the application the option to have another thread executed. These attributes may comprise a time for the thread to run, a number of messages it should execute on, or another criteria from the plurality of thread criteria or message fields disclosed herein.

Figure 1:
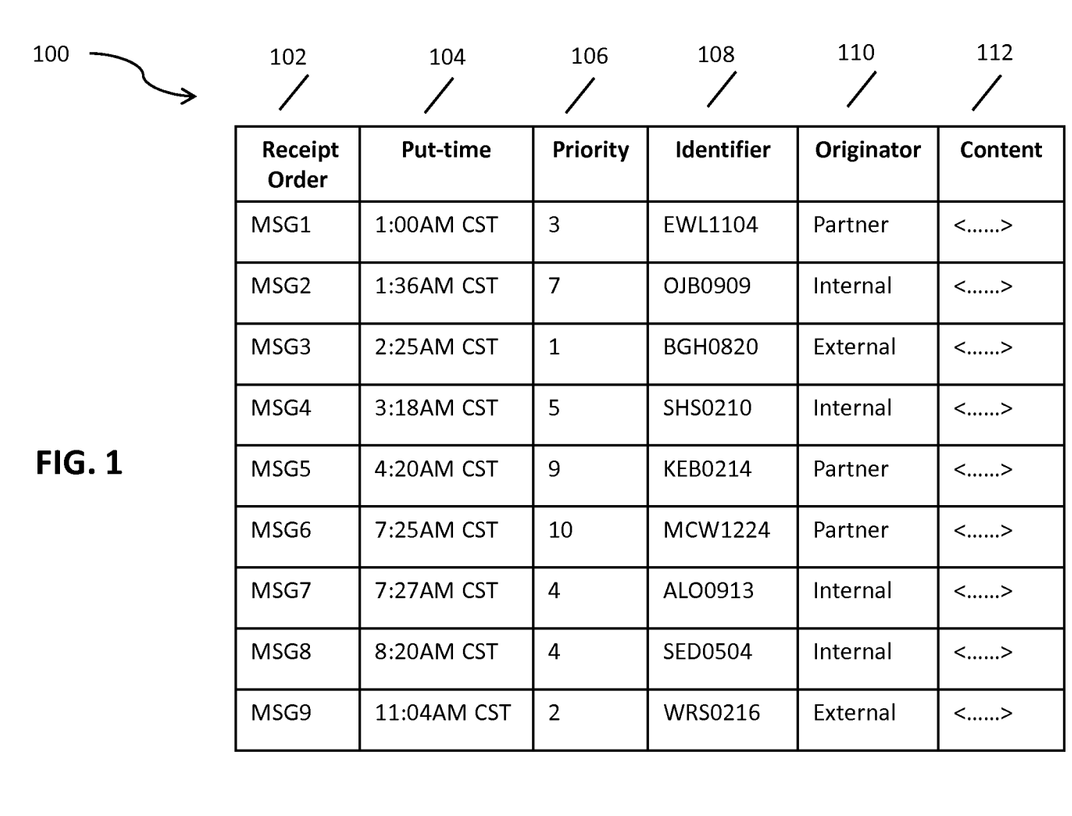
FIG. 1 is an illustration of part of a message queue according to an embodiment of the disclosure.

FIG. 1 is an illustration of part of a message queue according to an embodiment of the disclosure. The message queue 100 is shown in part here for illustration purposes only and comprises a plurality of fields. The plurality of fields may include an order in which the message was received by the queue 102, a put-time 104, which is the time at which the message was put into the queue, a message priority 106, and a message identifier 108. The message identifier 108 is shown in FIG. 1 as an alphanumeric code but in some embodiments may be an alpha code, a numeric code, a character code, or another combination of characters that uniquely identifies each new message received. The message queue 100 may further comprise an originator 110 of the message and a content 112 of the message. The originator 110 may indicate a specific party, service, department, or individual or, as illustrated, may indicate if the message originated internally, externally, or from a partner of the telecommunications service provider. The content 112 of the message may contain additional information regarding the message including references and identifiers to previously or concurrently submitted messages. In an alternate embodiment, a plurality of configurations of the message queue are designed with different or additional fields. In an embodiment, the message queue 102 does not comprise a field that identifies the order in which the messages was received by the queue 102 and instead the order of receipt is implied by the order of the addresses of the memory storing the queue. For example, a first message stored at address n may be determined to have been received after a second message stored at address (n−1) and to have been received before a third message stored at address (n+1), or some similar memory ordering arrangement. In one example, the put-time 104 or a similar field may be used to order the messages so field 102 may not be present. In alternate embodiments, there may be expanded fields for the message priority 106, the originator 110, the content 112, or a combination thereof wherein the expanded fields under these categories represent detailed information regarding each respective field.

Figure 2:
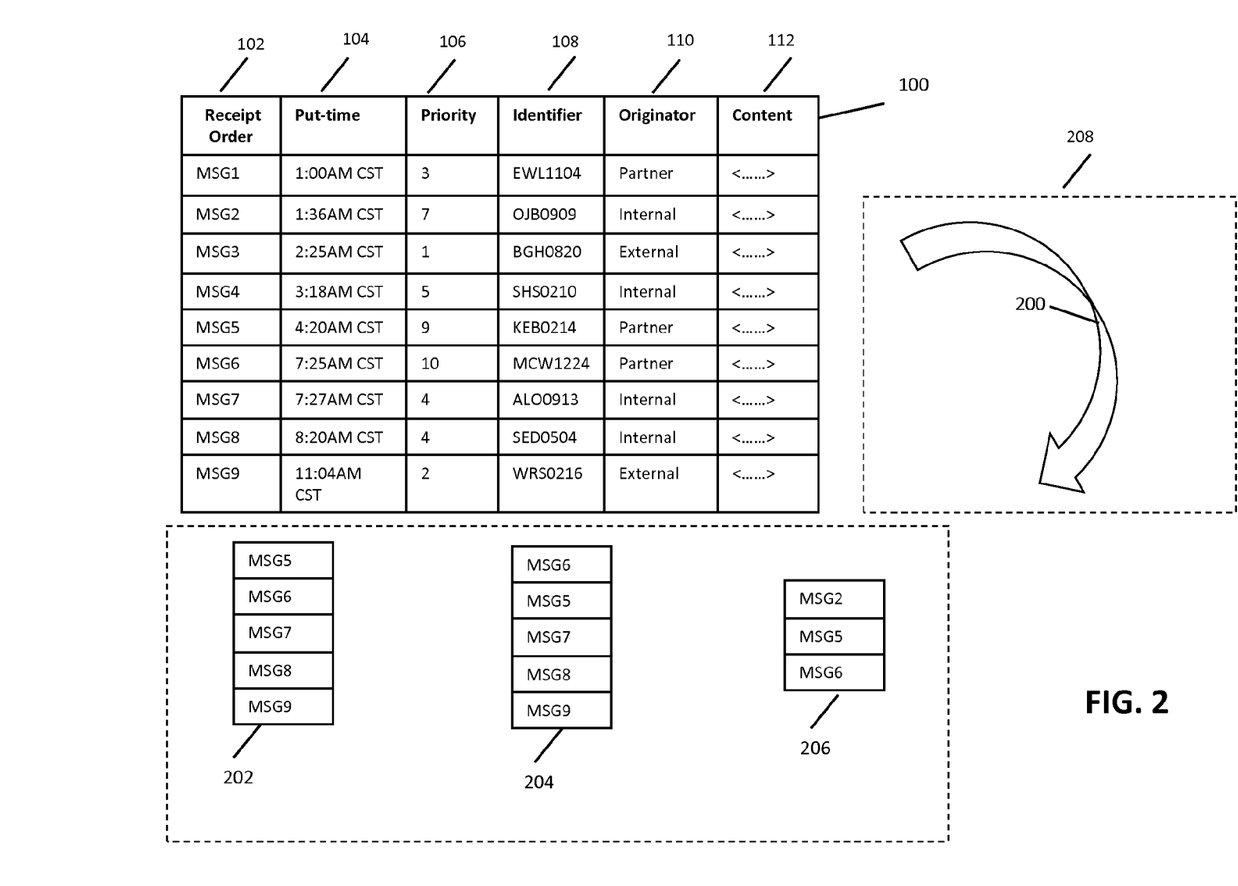
FIG. 2 is an illustration of a method of using threads to retrieve messages from a message queue according to an embodiment of the disclosure.

FIG. 2 is an illustration of a method of using threads to retrieve messages from a message queue according to an embodiment of the disclosure.

Figure 3:
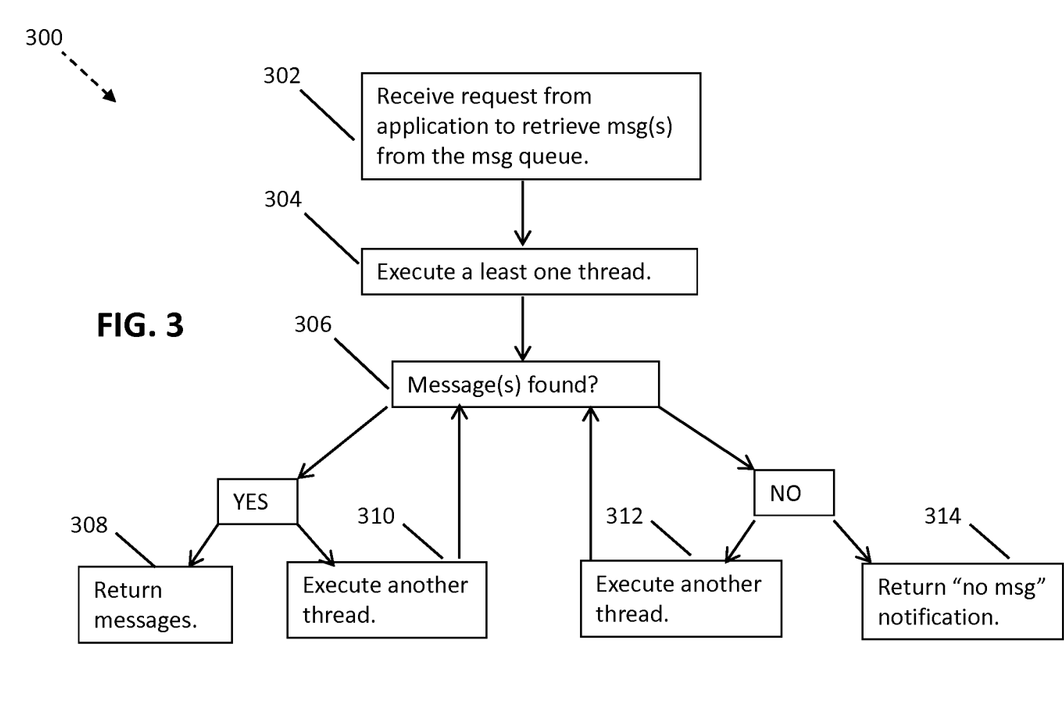
FIG. 3 is a flow chart of a method of retrieving messages from a message queue according to an embodiment of the disclosure.

FIG. 3 is a flow chart of a method 300 of retrieving messages from a message queue according to an embodiment of the disclosure. In FIG. 3, a request is received by a messaging middleware tool from an application to retrieve at least one message from a message queue at block 302. The messaging middleware tool 208 contains a plurality of threads 200 that execute on the message queue. In response to receiving this message, the messaging middleware tool 208 executes at least one thread at block 304 of a plurality of threads 200 in FIG. 2 to retrieve messages from the queue 100 based upon one or more criteria. The criteria may comprise the order in which the message was received by the queue 102, the put-time 104, which is the time at which the message was put into the queue 100, the message priority 106, the message identifier 108, the originator 110 of the message, and/or the content 112 of the message. The criteria may be a specific value, a range of values, a minimum, a maximum, an order (ascending or descending) or one or more fields, ranges of fields, or combinations of fields, or a combination thereof. At block 304, a first thread from the plurality of threads 200 is executed to retrieve messages received after 3:30 a.m. in the order that they were received (so, two criteria). It is appreciated that in the illustration, only the receipt order of the message is shown in the interest of space to represent the actual message which is retrieved. In an embodiment, a portion of the message or messages may be retrieved depending upon the request from the application, in that embodiment, the thread criteria may contain which field or fields from the message are to be retrieved. In another example at block 202, a second thread from the plurality of threads 200 retrieves messages that have a put-time 104 of after 3:30 a.m. and at block 204 orders those messages by descending priority 106 (two criteria). In another example at block 206, a third thread retrieves messages stored in the queue with a priority 106 higher than 7, without ordering those messages further (single criteria).

If a message is found at block 306 after the at least one thread is executed at block 304, the service request message or plurality of service request messages may be returned at block 308 to the application. In some embodiments, at least one other (second) thread is executed at block 310 and if messages are found, the message are returned at block 308 and in some embodiments a third thread is executed at block 310. These steps may repeat until the appropriate threads are executed at block 310. If a message is not found at block 306, a notification may be returned to the application at block 314 and, in some embodiments, another (second) thread may be executed at block 312. The second thread may be executed prior to, subsequent to, or concurrent with the notification sent at block 314.

Figure 4:
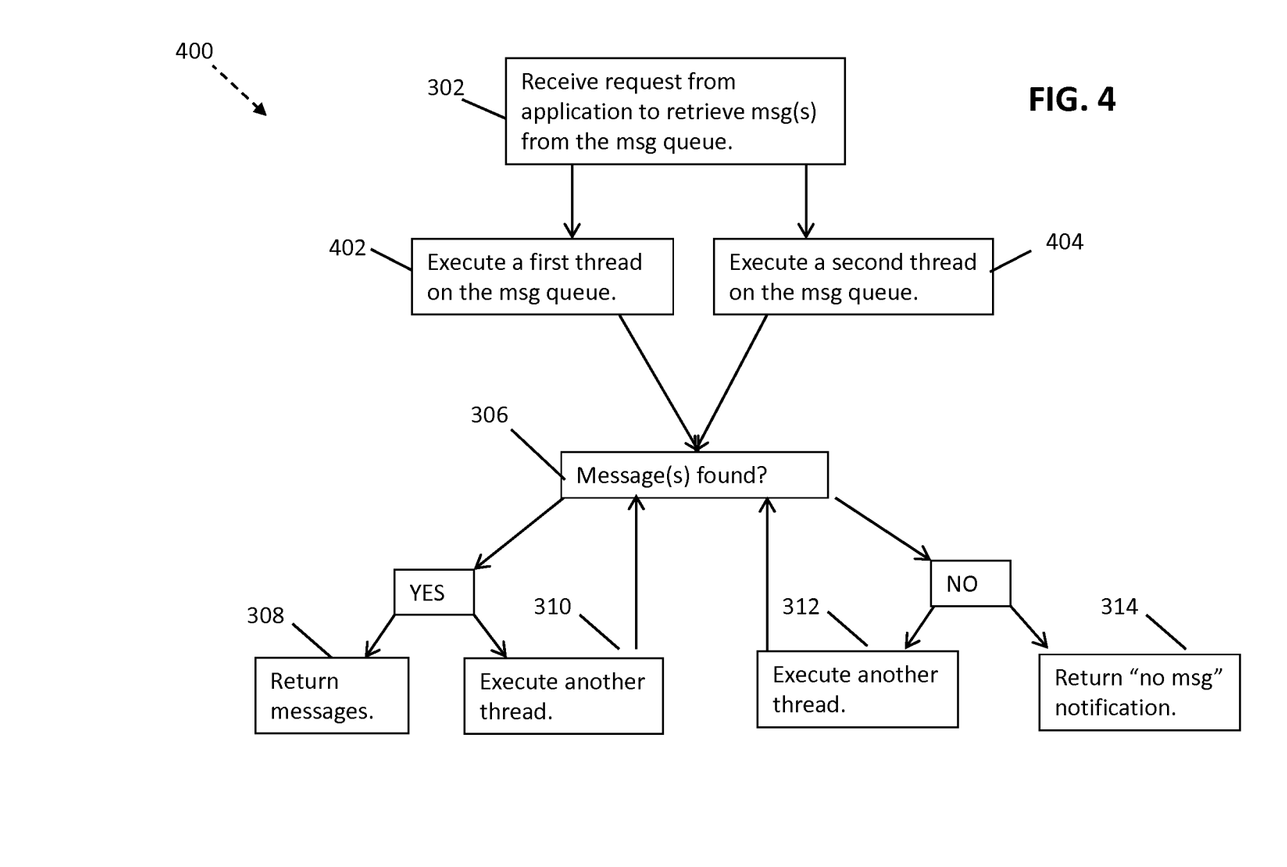
FIG. 4 is a flow chart of a method of retrieving messages from a message queue using multiple threads concurrently according to an embodiment of the disclosure.

FIG. 4 is a flowchart of an embodiment of a method 400 of retrieving messages from a message queue. At block 302, the messaging middleware tool receives a request from an application to retrieve at least one message from the message queue 100. Messages are retrieved concurrently by the execution of a first thread at block 402 and the second thread at block 404. In an embodiment, the first thread is executed at block 402 to return stored messages from the message queue 100 and a second thread is executed at block 404 to return messages as they are received by the queue 100, which may also be referred to as "real-time." Real-time is in contrast to the messages stored in the message queue 100 because, while messages received in real-time are still received and stored by the queue 100, the messages are retrieved by a thread as they come in using, for example, a modified FIFO system. While FIFO may be used conventionally, the modified FIFO would pull messages based on at least one other criteria and/or field of the message and may also sort the messages pulled based on that criteria or another criteria or field. If a message is found at block 306 by the first thread executed at block 402 and/or the second thread executed at block 404, the method proceeds in an iterative or looping manner as discussed above with respect to FIG. 3 at blocks 308, 310, 312, and 314.

Figure 5:
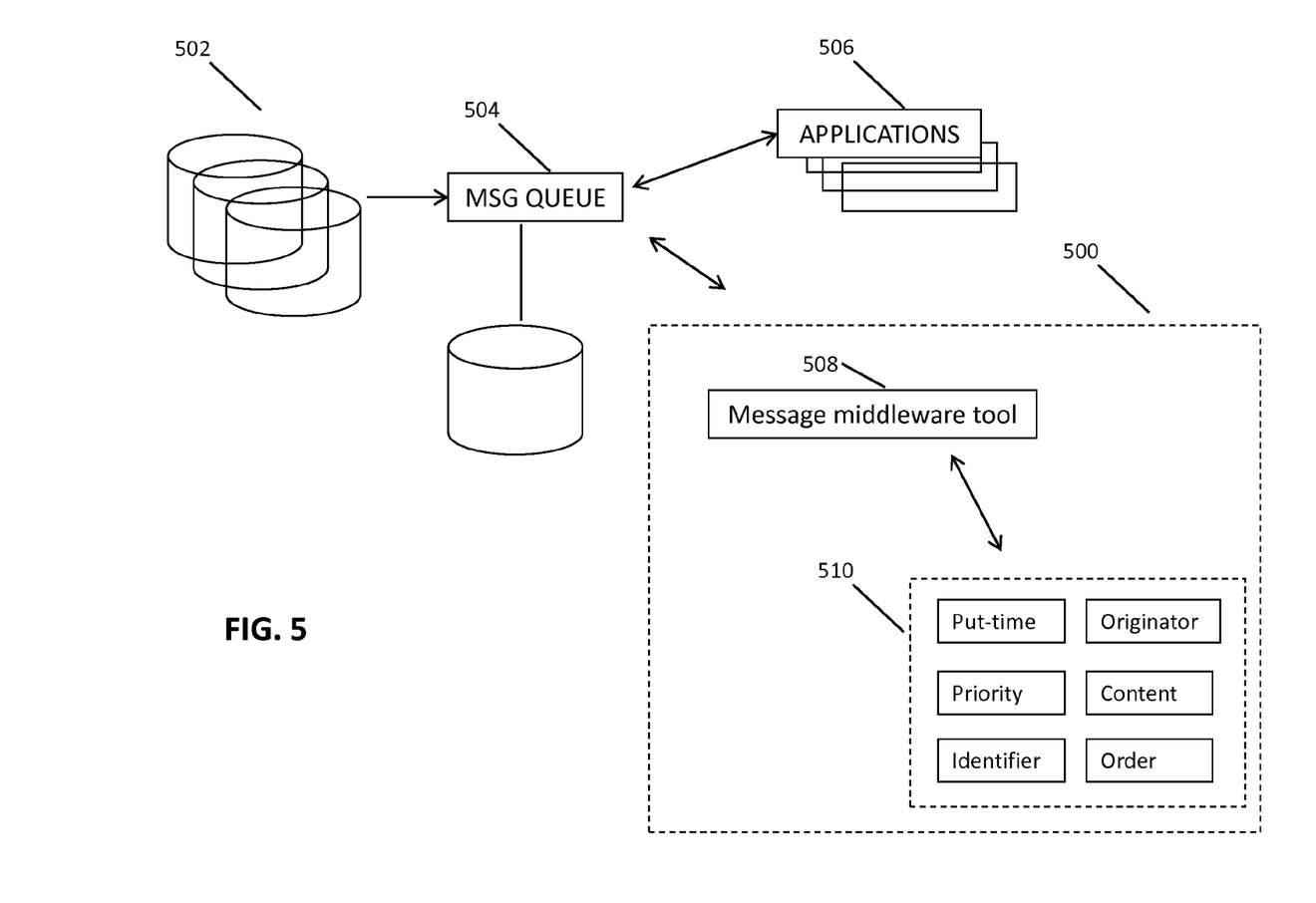
FIG. 5 is an illustration of a system that may execute a method of retrieving messages from a message queue.

FIG. 5 is an illustration of a system that may execute a method of retrieving messages from a message queue. At block 500, there is a system for retrieving messages from a message queue 504. A plurality of servers 502 send messages to the message queue 504 which comprise a plurality of fields as discussed in FIGS. 1 and 2. An application of a plurality of applications 506 sends a request to the system 500 through the messaging middleware tool 508 to execute a thread from the plurality of threads 510 on the message queue 504. The thread may be executed on the stored messages from the queue 504 or may execute on the message queue 504 specifically on messages as they are in real-time and retrieve and sometimes sort the messages as received in real-time that meet the criteria or criterion of the at least one thread. As discussed above in FIGS. 3 and 4, the threads may comprise one or more criteria such as the put-time, originator, content, priority, identifier, subsequent threads to execute, or order of retrieved messages. The criteria may be minimums, maximums, ranges, and negative criteria, for example "retrieve all messages except messages with a priority of 3 that originated from a partner." The order may be used in conjunction with any other criteria and may be an ascending order, a descending order, or may order the messages retrieved based upon one or more criteria. If no messages are retrieved when a thread is executed, a notification may be returned as discussed above to the application that sent the initial request for message retrieval. In some embodiments, the message may comprise a request for authorization to execute another thread or multiple threads, in alternate embodiments, a different thread or threads executes automatically if no messages are returned by a first attempt and first thread, depending upon what criteria the first thread comprises.

Figure 6:
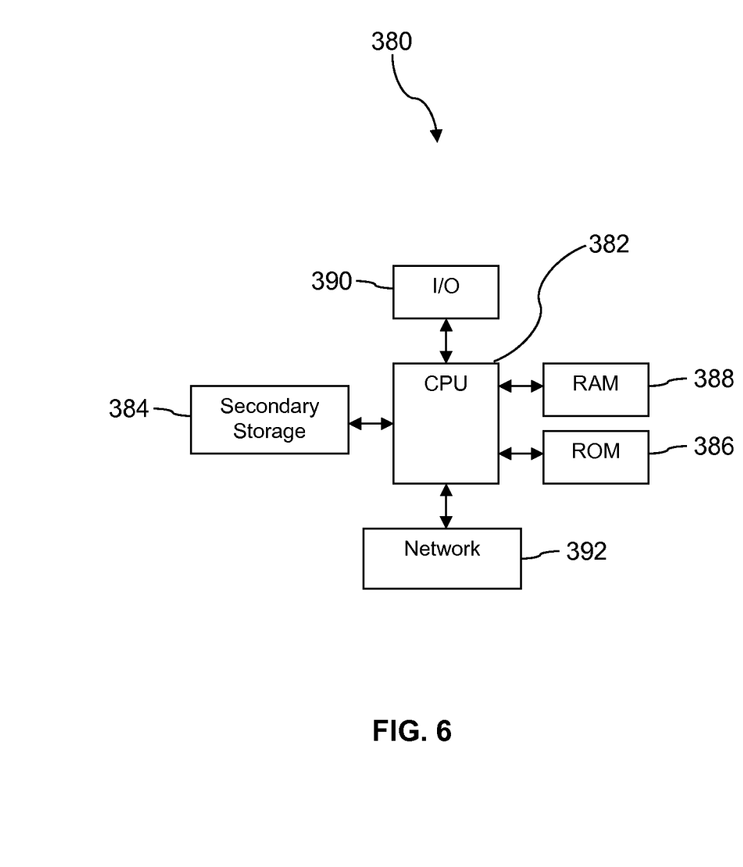
FIG. 6 illustrates an exemplary computer system suitable for implementing the several embodiments of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for retrieving service request messages from a message queue maintained by a messaging middleware tool, comprising:
a messaging middleware tool stored on a non-transitory memory and executable by a processor, the messaging middleware tool comprising a plurality of threads that communicate service request messages from each of a plurality of applications to a message queue, wherein the message queue is maintained on the non-transitory memory by the messaging middleware tool, and wherein each thread of the plurality of threads comprises at least two criteria that include a first criteria that executes subsequent to a second criteria; and
a first plurality of service request messages and a second plurality of service request messages,
wherein each service request message of the first plurality of service request messages and the second plurality of service request messages comprises at least one field of a plurality of fields,
wherein the messaging middleware tool executes at least one thread of the plurality of threads based upon at least one of the first criteria or the second criteria and returns at least one service request message from at least one of the first plurality of service request messages or the second plurality of service request messages based on a determination that the at least one service request message meets the at least one of the first criteria or the second criteria of the at least one thread, and
wherein the second criteria comprises an instruction to execute at least one other thread in response to the results returned from the first criteria.

2. The system of claim 1, wherein the at least two criteria comprise a time the service request message was put into the message queue, a range of time the message was put into the message queue, a priority, an originator, a content, a key word, or combinations thereof.

3. The system of claim 1, wherein the plurality of fields comprises a time the service request message was put into the queue, a priority, an originator, a content, and a service request message identifier.

4. The system of claim 2, wherein the priority is one of a criticality of the service request message, an originator of a service request message, a device type, or a message type.

5. The system of claim 1, wherein the at least one thread comprises different criteria than a second thread.

6. The system of claim 1, wherein the first plurality of service request messages are messages stored in the message queue prior to execution of the at least one thread, and wherein the second plurality of service request messages are messages retrieved in real-time as they come into the message queue during the execution of the at least one thread.

7. A method for retrieving service request messages from a message queue maintained by a messaging middleware tool, comprising:
executing, by a messaging middleware tool stored on a non-transitory memory and executable by a processor, at least one thread of a plurality of threads on a message queue in response to receiving, from an application, a request for at least one service request message from the message queue, wherein the message queue comprises a plurality of service request messages comprising a plurality of fields, wherein the plurality of fields comprises a time the service request message was put into the message queue, a priority, an originator, a content, and a message identifier, and wherein each thread of the plurality of threads comprises at least one criteria;
returning, by the messaging middleware tool to the application, at least one service request message based on the at least one thread in response to a determination that the at least one service request message that meets the at least one criteria of the thread is in the message queue;
executing, in response to the determination that the at least one service request message meets the at least one criteria of the thread, a different thread of the plurality of threads on the message queue, wherein the at least one criteria of the thread is different than the at least one criteria of the different thread; and
returning, in response to a determination that no service request messages in the message queue meet the at least one criteria of the thread, a notification to the application.

8. The method of claim 7, wherein the at least one criteria of the thread comprises one or more of the time the service request message was put into the message queue, a range of time the service request message was put into the message queue, the priority, the originator, the content, a key word, or combinations thereof.

9. The method of claim 7, further comprising executing in response to the determination that no service request messages in the message queue meet the at least one criteria of the thread, a second thread of the plurality of threads on the plurality of service request messages, wherein the at least one criteria of the thread is different than the at least one criteria of the second thread.

10. The method of claim 9, where the second thread is executed in response to the message middleware tool receiving authorization from the application.

11. The method of claim 7, wherein each thread of the plurality of threads comprises at least two criteria including a first criteria that executes subsequent to a second criteria.

12. The method of claim 11, wherein the second criteria comprises an instruction to execute at least one other thread in response to the results returned from the first criteria.

13. The method of claim 11, wherein the second criteria comprises an instruction to execute at least one other thread in response to a determination that the thread did not retrieve any service request messages from the message queue.

14. A method for retrieving service request messages from a message queue using a messaging middleware tool, comprising:
- receiving, by a messaging middleware tool stored on a non-transitory memory and executable by a processor, from an application, a first request to retrieve at least one service request message from a plurality of service request messages stored in a message queue;
- executing, by the messaging middleware tool, in response to receiving the first request, a first thread of a plurality of threads on the plurality of service request messages stored in the message queue, wherein each service request message of the plurality of service request messages comprises a plurality of fields, and wherein each thread of the plurality of threads comprises at least one criteria;
- executing, by the messaging middleware tool, a second thread of the plurality of threads on the message queue, wherein the second thread executes on service request messages received in the message queue in real-time and applies the at least one criteria;
- returning, by the messaging middleware tool to the application, at least one service request message based on the first thread in response to a determination that the at least one service request message in the message queue meets the at least one criteria of the first thread;
- returning, by the messaging middleware tool to the application, concurrent with the at least one service request message returned in response to the first thread, at least one other service request message based on the second thread in response to a determination that the at least one other service request message meeting the at least one criteria of the second thread is in the message queue, wherein the at least one service request message returned based on the first thread is different than the at least one other service request message returned based on the second thread;
- returning, in response to a determination that at least one of the first thread or the second thread did not retrieve service request messages, a notification to the application; and
- executing, in response to the determination that one or more service request messages meet the at least one criteria of the first or the second threads, at least a third thread on at least one of the plurality of service request messages stored in the message queue or the plurality of service request messages as they are received in the message queue in real-time.

15. The method of claim 14, wherein the at least one criteria of the first thread comprises at least one of a time the service request message was put into the message queue, a range of time the service request message was put into the message queue, a priority, a originator, a content, a key word, or combinations thereof.

16. The method of claim 14, wherein the plurality of fields comprises a time the service request message was put into the message queue, a priority, an originator, a content, and a message identifier.

17. The method of claim 14, wherein the at least one criteria of the third thread is different than the at least one criteria of at least one of the first or the second threads.

18. The method of claim 14, further comprising executing in response to the determination that no service request messages in the message queue meet the at least one criteria of the first thread, a different thread on the plurality of service requests messages, wherein the at least one criteria of the first thread is different than the at least one criteria of the different thread.

* * * * *